United States Patent

Kohlstädt et al.

[11] Patent Number: 5,913,506
[45] Date of Patent: Jun. 22, 1999

[54] BALL COCK OF PLASTICS MATERIAL

[75] Inventors: Egon Kohlstädt, Vlotho; Fritz-Günther Pape, Porta Westfalice-OT. Eisbergen, both of Germany

[73] Assignee: ASV Stübbe GmbH & Co. KG, Germany

[21] Appl. No.: 09/040,858

[22] Filed: Mar. 18, 1998

[30] Foreign Application Priority Data

Mar. 20, 1997 [DE] Germany .......................... 197 11 740

[51] Int. Cl.[6] .................................................. F16K 5/06
[52] U.S. Cl. .................................. 251/315.15; 251/315.1
[58] Field of Search ............................ 251/315.1, 315.15

[56] References Cited

U.S. PATENT DOCUMENTS 4,072,161  2/1978  Schoenweiss et al. ........ 251/315.15 X
4,697,787  10/1987  Pillebver ........................ 251/315.15
5,396,922  3/1995  Ottens ........................... 251/315.15 X Primary Examiner—John Fox
Attorney, Agent, or Firm—Blakely Sokoloff Taylor & Zafman

[57] ABSTRACT

The ball cock has a housing in which a valve ball is rotatably arranged. The sealing is effected by two sealing rings which are retained by cages. Disposed on each side of the ball cock is a spigot for welding the valve to the connecting pipes. The connection between the spigots and the flat parallel end surfaces of the housing and of the associated cage is produced by vibration welding. Absolutely no changes in dimension or shape occur and a strength is produced which corresponds to that of the plastic material. The ball cock is of simple construction and may be manufactured economically.

8 Claims, 1 Drawing Sheet

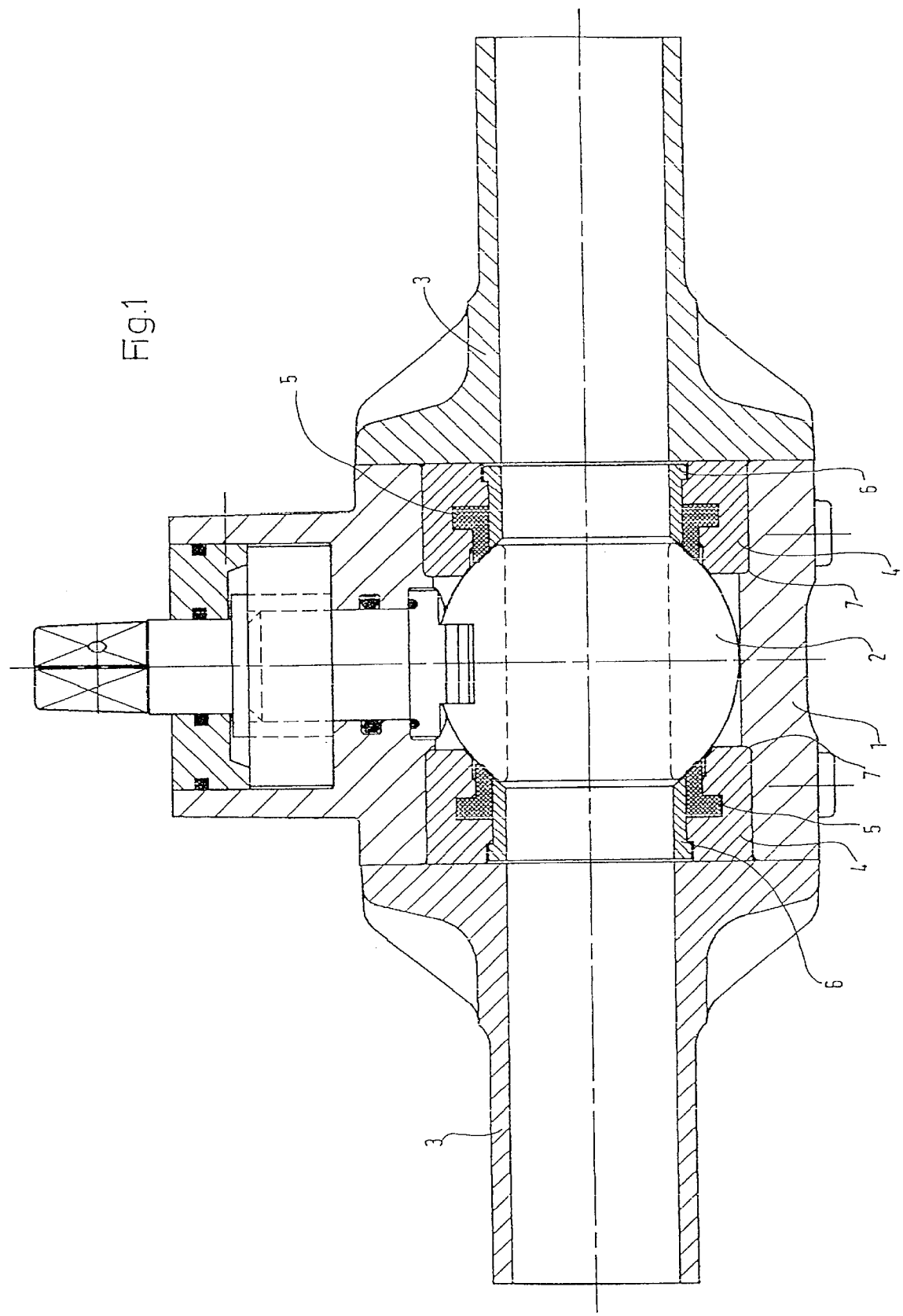

BALL COCK OF PLASTICS MATERIAL

1. FIELD OF THE INVENTION

The invention relates to a ball cock of plastics material including a housing, which affords an inlet and an outlet, a valve ball, which is rotatably arranged in the housing with the interposition of two sealing rings, two spigots, which adjoin the inlet and the outlet in the housing, and at least one cage, which receives one of the sealing rings and is urged by one of the connectors in the direction towards the valve ball.

2. DESCRIPTION OF THE PRIOR ART

The spigots of such ball cocks, which are used for welding the valve to the connecting pipes, are connected to the housing by clamping nuts. A construction is known in practice in which the housing constitutes the seat for one of the sealing rings so that a cage need be provided only in the other half of the valve for the sealing ring which is present there. The cage requires for its part additional seals with respect not only to the housing but also the associated spigot. The known construction thus has a large number of components which must be connected together during assembly and furthermore make store-keeping more difficult. Furthermore, there is a certain degree of susceptibility to trouble as a result of the number of the seals and releasable connections.

It is the object of the invention to provide a ball cock of the type referred to above which is highly reliable and is simple constructionally and to manufacture.

SUMMARY OF THE INVENTION

In order to solve this object the ball cock of the type referred to above is characterised in accordance with the invention in that the housing and the cage have parallel outer end surfaces to which the associated spigot is welded over its entire area by vibration welding.

It was not previously possible to weld the spigots, which comprise plastics material, to the plastics housing since deformation and warping was to be expected due to the high thermal loading. Softening of the plastics material, particularly in the region of the cage, would have had particularly negative consequences. Since the sealing ring engages the valve ball under a biasing force, it would have been able to displace the cage and thus to reduce or even eliminate the biasing force, i.e. the sealing action.

The vibration welding used in accordance with the invention limits the production of heat solely to the contacting surfaces. The necessary softening occurs only at this position, practically with no penetration depth. Deformation, displacement or warping can thus not occur.

The method may be performed extremely rapidly and produces a strength with a reduction factor of 0.9. This means that the strength of the original material is almost achieved. This is due to the fact that the connection is produced over the entire area. Despite the considerable wall thicknesses, no preparatory steps, which are otherwise conventional when welding, are necessary.

The spigot is connected not only to the housing but also to the cage without a positional change of the cage occurring. The desired biasing force of the sealing ring is thus maintained. At the same time, the cage is fixed in the predetermined position without change. Its connection over the entire area to the spigot makes the use of additional seals with respect to the spigot and the housing unnecessary. The number of components and of the possible sources of error is thus decreased. Overall, there is an extremely low manufacturing and assembly expense.

All plastic materials, and in part also differing plastic materials, can be welded together.

The inner surface of the cage preferably engages a housing shoulder so that it may be positioned very simply. Of greatest importance is that the considerable forces, which must be used when vibration welding, are absorbed here.

In an important further embodiment of the invention it is proposed that a clamping ring, which supports the sealing ring, is inserted into a through-hole in the cage and is secured by the spigot. The cage may thus be simply configured, the sealing ring being reliably retained by the clamping ring and the latter being prevented from altering its position by the spigot which is firmly connected to the cage.

A particularly simple embodiment is produced if the sealing ring is of angular construction in cross-section, one of its limbs engaging the valve ball at its end and the clamping ring on its radially inner surface. A simple, reliable and sturdy seal is thus provided in a constructionally favourable manner.

Particularly favourable conditions are produced if the half of the ball cock associated with the other spigot also has the features discussed above. The advantages which are achieved thus take effect at both halves of the valve.

The invention will be explained below in more detail in conjunction with a preferred exemplary embodiment with reference to the accompanying drawing.

BRIEF DESCRIPTION OF THE DRAWING

FIG. 1 of the drawing is an axial sectional view of a ball cock.

DESCRIPTION OF THE PREFERRED EMBODIMENT

The illustrated ball cock has a housing 1 in which a valve ball 2 is rotatably arranged. The housing is provided on the inlet and the outlet side with spigots 3 which enable the valve to be welded to the connecting pipes.

The housing also contains two cages 4, in which a respective sealing ring 5 is disposed. The sealing rings 5 are of angular construction in cross-section, their axial limbs engaging the valve ball 2 at the end and being supported on their radially inner side by a clamping ring 6. The clamping rings 6 are inserted from the exterior into the cages 4 and are secured in their position by the spigots 3. Housing shoulders 7 serve to position and support the cages 4.

After the cages 4 have been inserted with their sealing rings 5 and clamping rings 6 into the housing 1, the spigots 3 are connected not only to the housing 1 but also to the respective associated cage 4, namely by vibration welding. The connection is thus produced over the entire area without changes in dimension or shape. In particular, the stressing of the sealing rings 5 is maintained since no positional change of the cages 4 occurs as a result of impermissible softening of the plastic material. The direct connection between the spigots 3 and the associated cages 4 means that additional seals between the cages, the housing and the spigots are superfluous.

The ball cock has a small number of component parts which may be simply manufactured and connected together.

The vibration welding takes only 10% of the time which would have to be spent with heat welding. A connection is produced by the vibration welding which corresponds to 90% of the strength of the original material.

Modifications of the described construction are of course possible within the scope of the invention. Thus sealing rings of different shape can be used. As a result, the supporting clamping rings may be omitted under certain circumstances. However, the illustrated construction has proved to be particularly advantageous.

It is also possible to apply such a construction only to one half of the ball cock. The cage is then constituted in the other half by a housing projection, into which the sealing ring is inserted.

We claim:

1. Ball cock of plastics material including a housing, which affords an inlet and an outlet, a valve ball, which is rotatably arranged in the housing with the interposition of two sealing rings, two connectors, which adjoin the inlet and the outlet in the housing, and at least one cage, which receives one of the sealing rings and is urged by one of the connectors in the direction towards the valve ball, the housing and the cage having parallel outer end surfaces to which the associated connector is welded over its entire area by vibration welding.

2. Ball cock as claimed in claim 1 wherein the inner surface of the cage engages a housing shoulder.

3. Ball cock as claimed in claim 1 wherein a clamping ring, which supports the sealing ring, is inserted into a through-hole in the cage and is secured by the connector.

4. Ball cock as claimed in claim 3, wherein the sealing ring is of angular construction in cross-section with two limbs and wherein one of its limbs engages the valve ball at its end and the clamping ring on its radially inner surface.

5. Ball cock of plastics material including a housing, which affords an inlet and an outlet, a valve ball, which is rotatably arranged in the housing with the interposition of two sealing rings, two connectors, which adjoin the inlet and the outlet in the housing, and two cages, each of which receives one of the sealing rings and is urged by one of the connectors in the direction towards the valve ball, the housing and the cages having parallel outer end surfaces to which the associated connector is welded over its entire area by vibration welding.

6. Ball cock as claimed in claim 5 wherein the inner surfaces of the cages engage respective housing shoulders.

7. Ball cock as claimed in claim 1 wherein a clamping ring, which supports the associated sealing ring, is inserted into a through-hole in each cage and is secured by the associated connector.

8. Ball cock as claimed in claim 3 wherein the sealing rings are of angular construction in cross-section and wherein one limb of each engages the valve ball at its end and the associated clamping ring on its radially inner surface.

* * * * *